(12) United States Patent
Bonny

(10) Patent No.: US 10,385,882 B1
(45) Date of Patent: Aug. 20, 2019

(54) FLOW DIVIDER ASSEMBLY

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 321 days.

(21) Appl. No.: 15/360,269

(22) Filed: Nov. 23, 2016

Related U.S. Application Data

(63) Continuation of application No. 14/212,571, filed on Mar. 14, 2014, now Pat. No. 9,506,561.

(60) Provisional application No. 61/793,540, filed on Mar. 15, 2013.

(51) Int. Cl.
*F16D 31/02* (2006.01)
*F15B 13/02* (2006.01)
*F03C 1/06* (2006.01)
*F15B 11/22* (2006.01)

(52) U.S. Cl.
CPC .......... *F15B 13/022* (2013.01); *F03C 1/0642* (2013.01); *F03C 1/0663* (2013.01); *F03C 1/0668* (2013.01); *F15B 11/22* (2013.01); *F15B 2211/40523* (2013.01); *F15B 2211/782* (2013.01)

(58) Field of Classification Search
CPC ...... F16H 61/444; F15B 15/18; F15B 11/042; F15B 11/22; F15B 13/022; F15B 2211/40523; F15B 2211/4053; F15B 2211/40538; F15B 2211/782; F15B 2215/30; F03C 1/0639
See application file for complete search history.

(56) References Cited

U.S. PATENT DOCUMENTS

| | | | |
|---|---|---|---|
| 2,353,802 | A | 7/1944 | Zimmermann |
| 2,862,449 | A | 12/1958 | Wyland |
| 4,041,843 | A | 8/1977 | Mischenko et al. |
| 4,102,425 | A | 7/1978 | Marsden et al. |
| 4,201,272 | A | 5/1980 | Midolo |

(Continued)

FOREIGN PATENT DOCUMENTS

DE 2857567 8/1980

OTHER PUBLICATIONS

Bosch Rexroth AG, "Methods for Synchronization in Hydraulic Drive Systems," Civil Engineering—DC-IA/SET22, Jun. 15, 2011.

(Continued)

*Primary Examiner* — Michael Leslie
(74) *Attorney, Agent, or Firm* — Neal, Gerber & Eisenberg LLP

(57) ABSTRACT

A flow divider assembly for use with a hydraulic pump provides flow to separate drive motors for use in a vehicle or other application. A pair of flow divider motors may be mounted on a block and have a common axis of rotation. The ratio between the two may be controlled by adjustment of the angles of the respective thrust bearings of the flow divider motors. A valve may connect the outlet of one of the flow divider motors or the outlet of the other flow divider motor. passage to the second outlet passage. Additional bypass valves may be provided to permit direct connection between the hydraulic pump and the separate drive motors.

20 Claims, 13 Drawing Sheets

(56) References Cited

U.S. PATENT DOCUMENTS

| | | | |
|---|---|---|---|
| 4,223,594 A * | 9/1980 | Gherner | F03C 1/0605 |
| | | | 91/499 |
| 4,346,645 A | 8/1982 | Wusthof et al. | |
| 4,503,928 A | 3/1985 | Mallen-Herrero et al. | |
| 4,639,203 A | 1/1987 | Zumbusch | |
| 5,511,368 A | 4/1996 | Kocher | |
| 6,149,221 A | 11/2000 | Mentink | |
| 6,922,992 B1 | 8/2005 | Morgan | |
| 6,973,783 B1 | 12/2005 | Hauser et al. | |
| 7,000,386 B1 | 2/2006 | Morgan | |
| 7,041,026 B2 * | 5/2006 | Okada | F16H 48/285 |
| | | | 475/221 |
| 7,526,994 B2 | 5/2009 | Hu | |
| 7,988,428 B1 | 8/2011 | MacHarg | |
| 9,416,871 B1 | 8/2016 | Bonny | |
| 2010/0050627 A1 | 3/2010 | Nelson et al. | |

OTHER PUBLICATIONS

Hansa TMP Catalog, Radial Piston Flow Dividers FD/FDM Series, at least as early as 2010.

White Drive Products Catalog, FD Series Flow Dividers, Apr. 23, 2009.

\* cited by examiner

US 10,385,882 B1

FLOW DIVIDER ASSEMBLY

CROSS-REFERENCE TO RELATED APPLICATION

This application is a continuation of U.S. patent application Ser. No. 14/212,571, filed Mar. 14, 2014, which claims priority to U.S. Provisional Patent Application No. 61/793,540, filed on Mar. 15, 2013, the contents of which are fully incorporated herein by reference.

BACKGROUND OF THE INVENTION

This invention relates generally to flow control mechanisms for use with a hydraulic apparatus.

SUMMARY OF THE INVENTION

The inventions herein disclose flow controls for use in connection with, e.g., vehicle implements and other applications where the flow of a variable displacement, single direction pump needs to be divided to different flow paths. In certain embodiments a constant proportion flow divider may be used, while other embodiments depict the use of different valves to permit further control.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
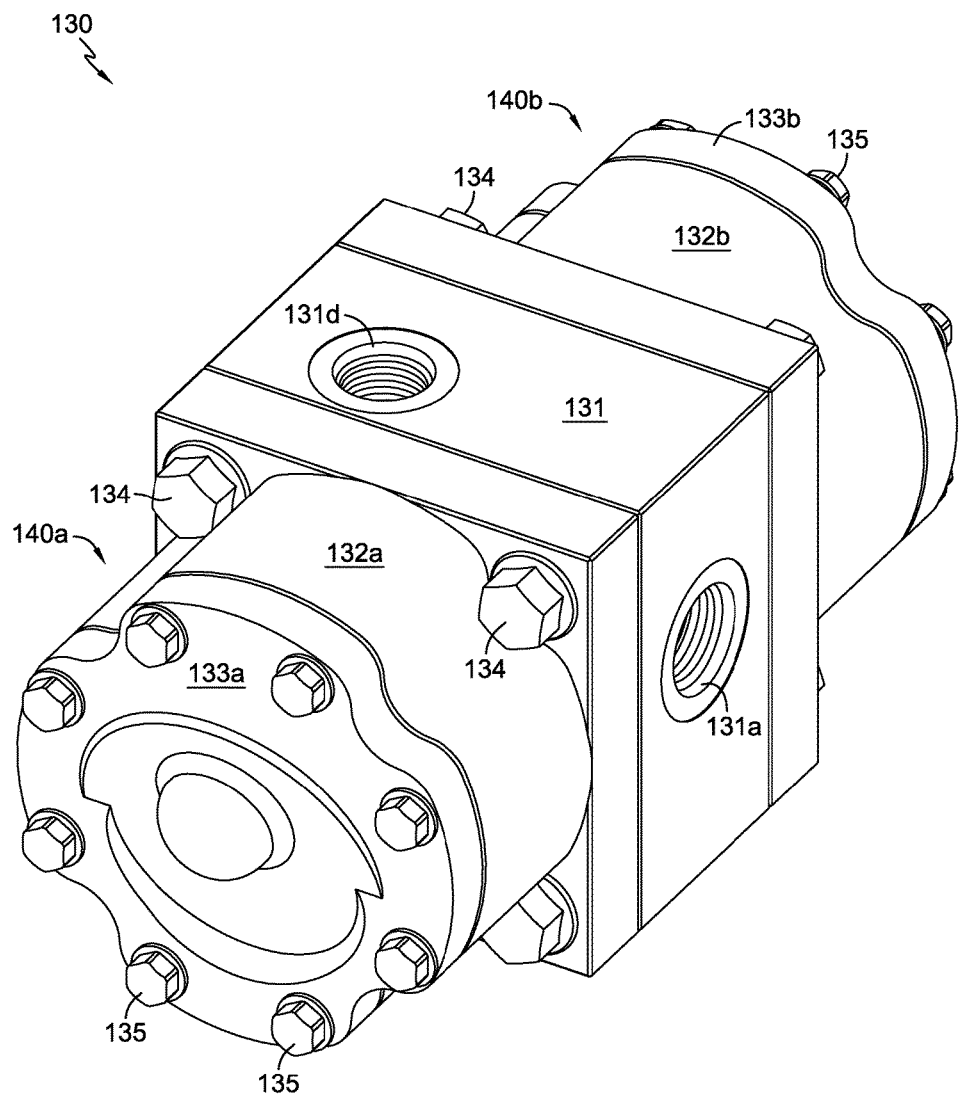
FIG. 1 is a perspective view of a dual motor flow divider assembly in accordance with a first embodiment of the invention.
Figure 2:
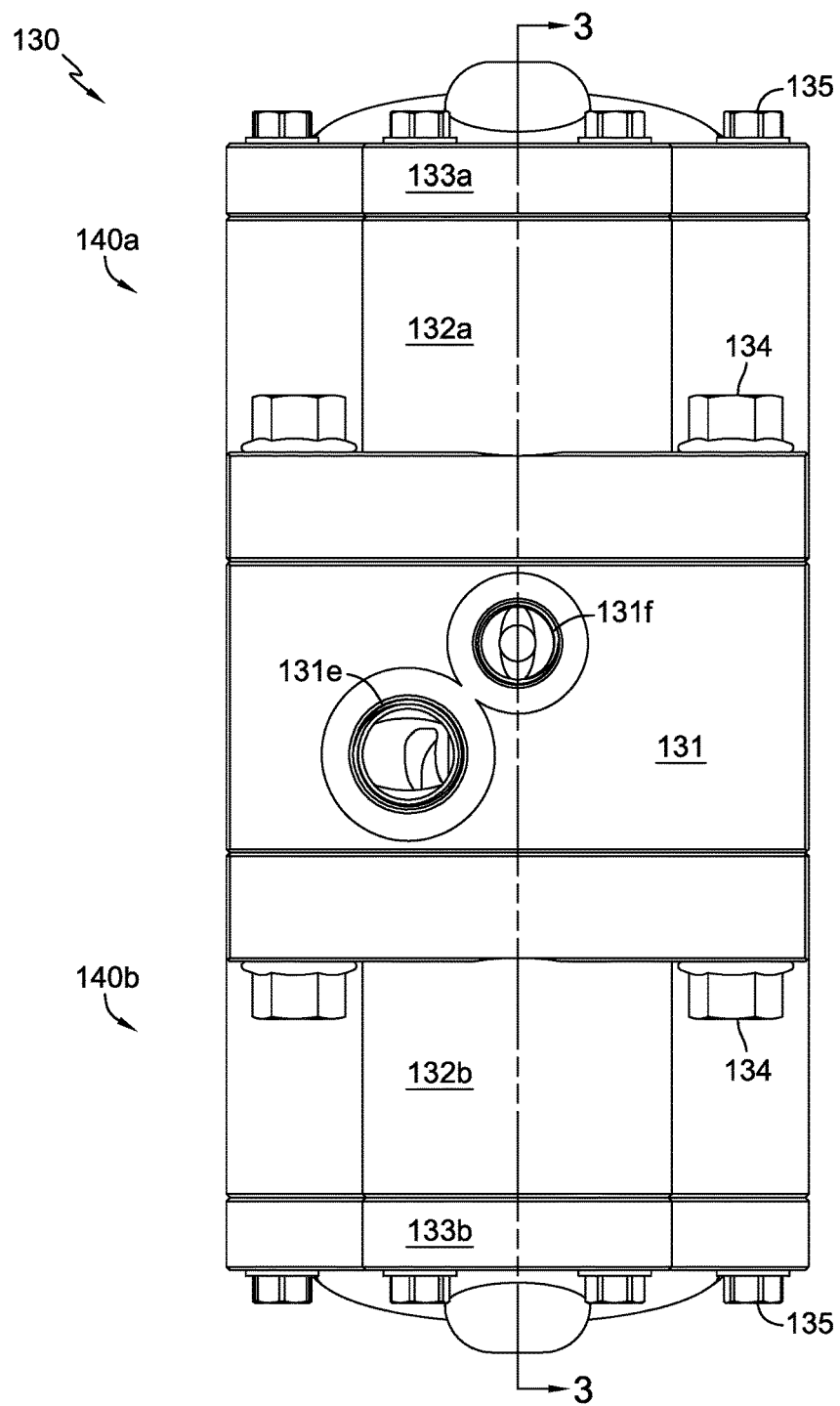
FIG. 2 is a side elevational view of the flow divider assembly of FIG. 1.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. To the extent elements are given numerals that differ in the prefix to those of elements previously described and are not described in detail, it will be understood that such elements can be essentially or substantively identical to the previously described feature. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 6:
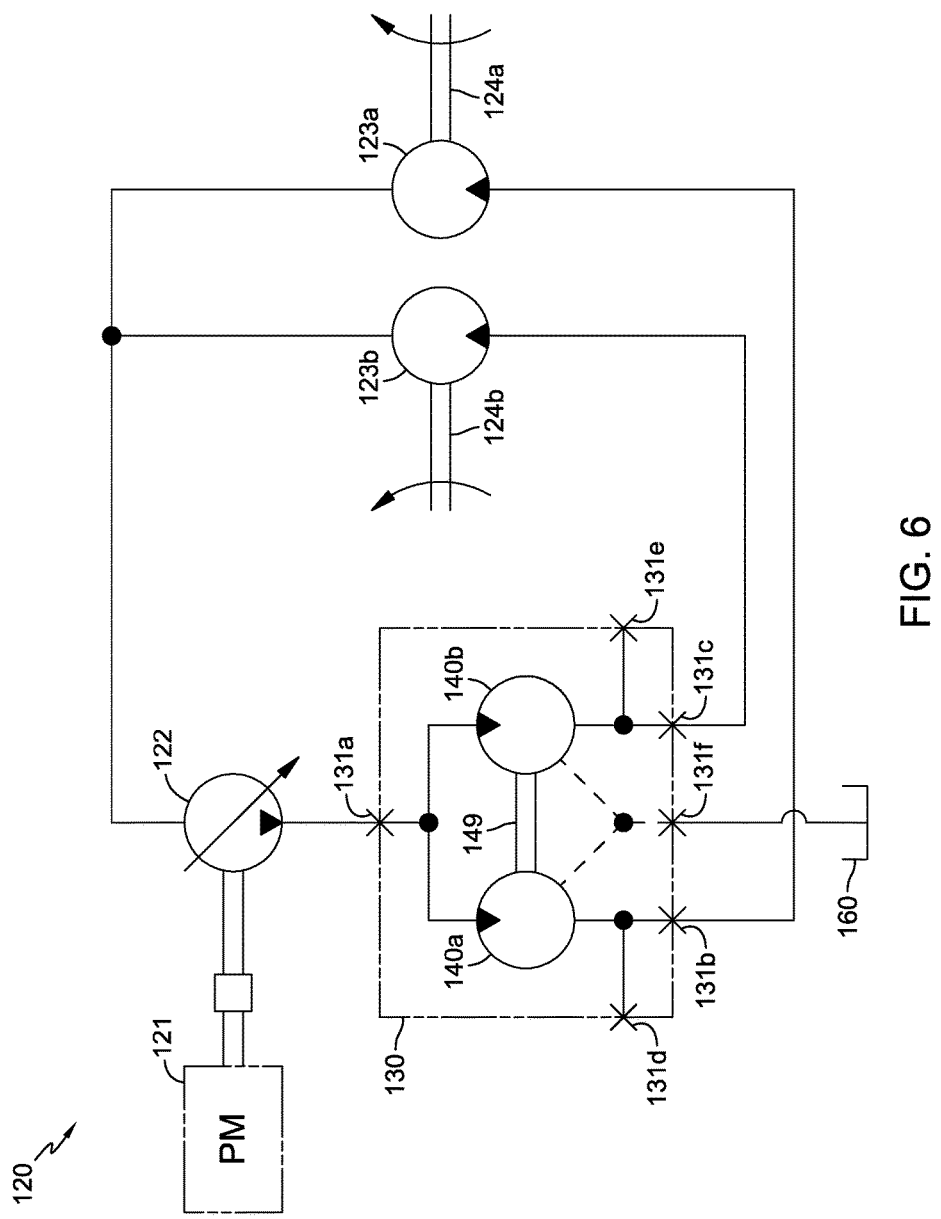
FIG. 6 is a schematic showing an exemplary drive system incorporating the flow divider assembly of FIG. 1.
Figure 7:
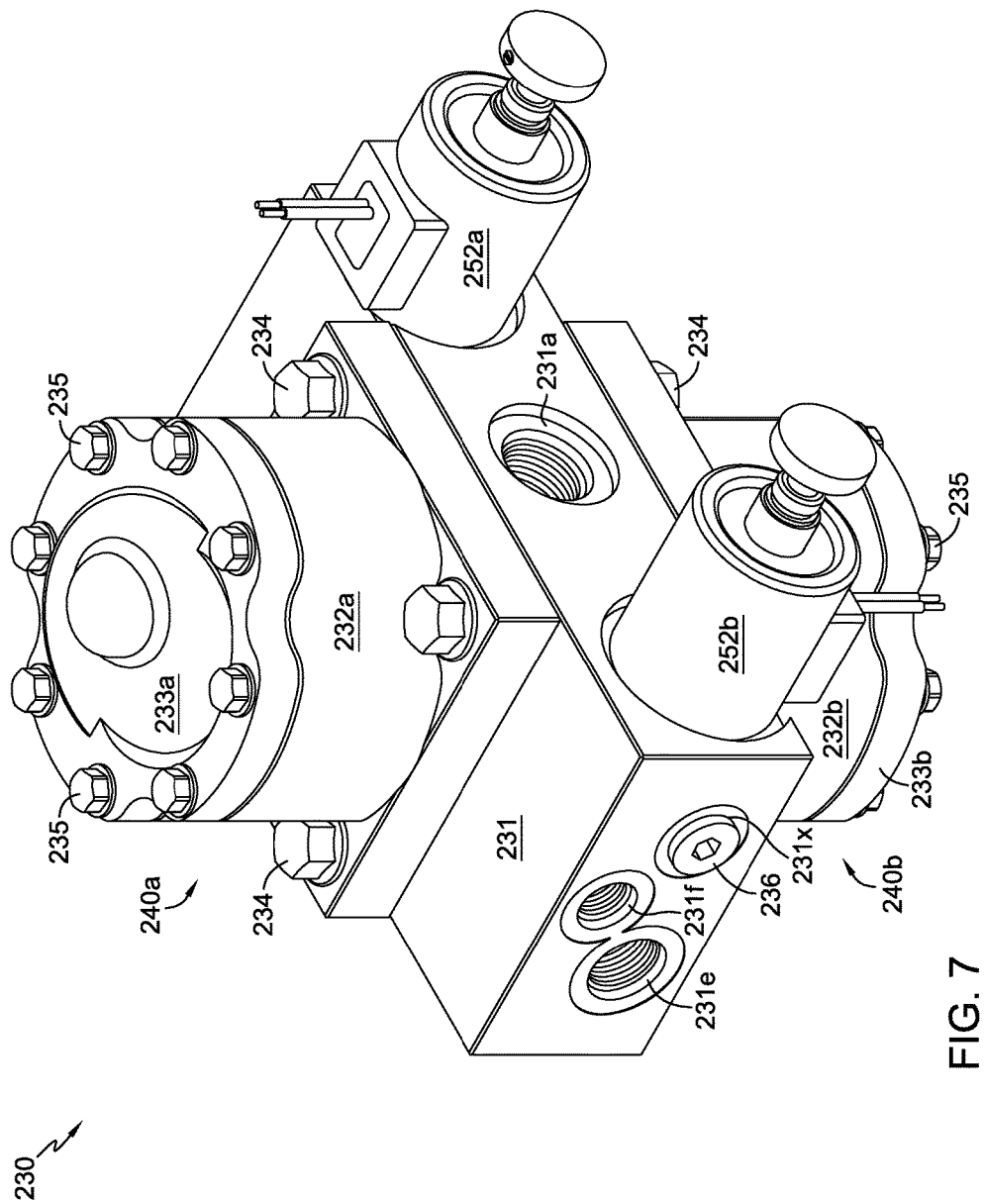
FIG. 7 is a perspective view of a dual motor flow divider assembly in accordance with a second embodiment of the invention.
Figure 8:
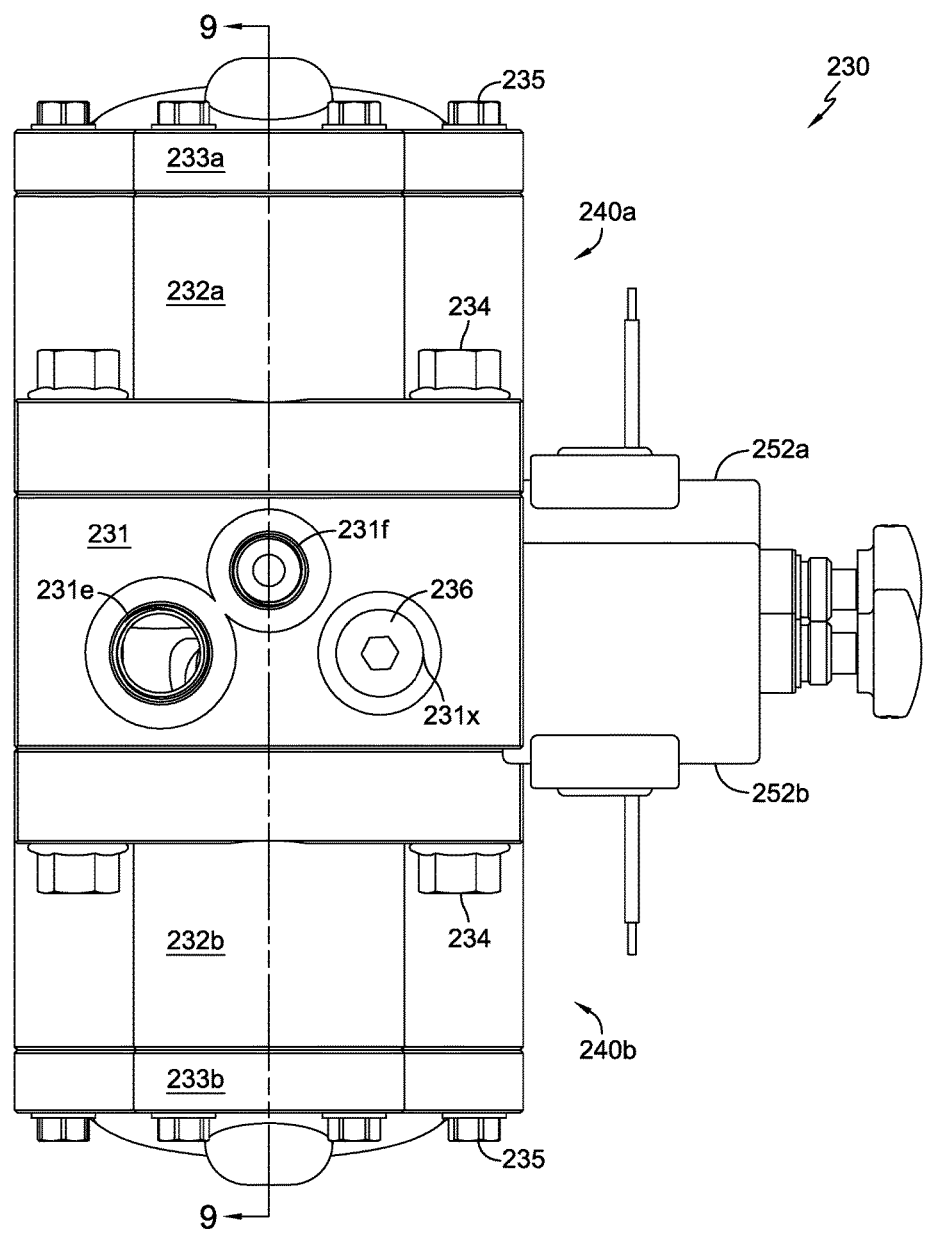
FIG. 8 is a side elevational view of the flow divider assembly of FIG. 7.

FIG. 1 depicts a flow divider assembly 130 incorporating a pair of motor assemblies 140a and 140b, which may be referred to as flow divider motors, disposed on a port block 131. The schematic in FIG. 6 shows drive system 120 having flow divider assembly 130 as well as prime mover 121 driving a variable displacement pump 122. The output of flow divider assembly 130 drives a pair of motors 123a, 123b and their respective drive shafts or axles 124a, 124b for a vehicle or other application.

Each motor assembly 140a, 140b comprises a motor housing 132a, 132b having a proximal end secured to the respective opposing faces of port block 131 by means of fasteners 134. Each housing also includes a cap 133a, 133b secured to the distal end of the respective motor housing 132a, 132b by means of fasteners 135. The two motor cylinder blocks 141a and 141b disposed with the respective motor housings 132a, 132b, on a pair of running surfaces 131y (running surface A) and 131z (running surface B) formed on opposing faces of port block 131.

Figure 3:
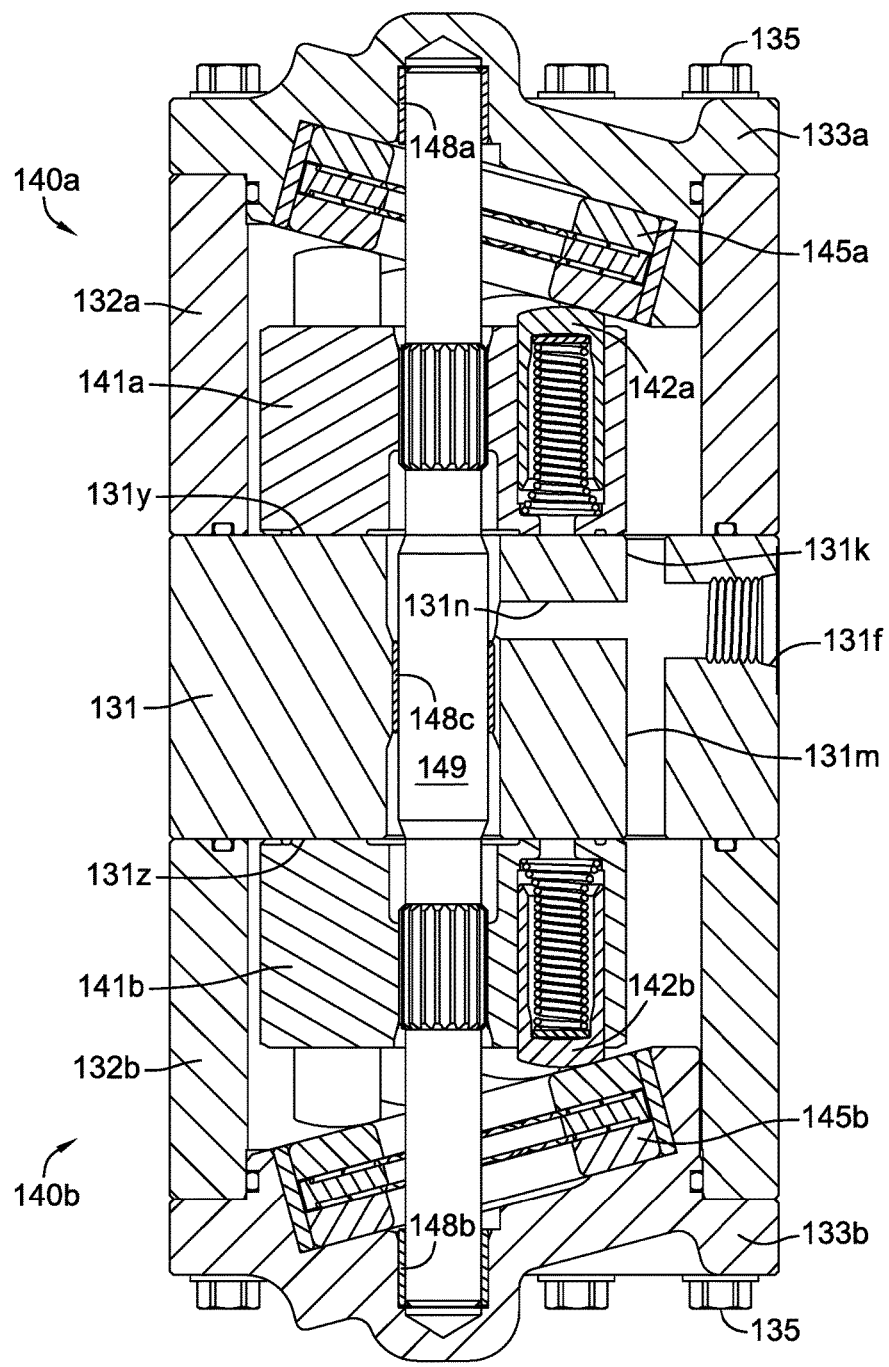
FIG. 3 is a cross-sectional view along the lines 3-3 of FIG. 2.
Figure 4:
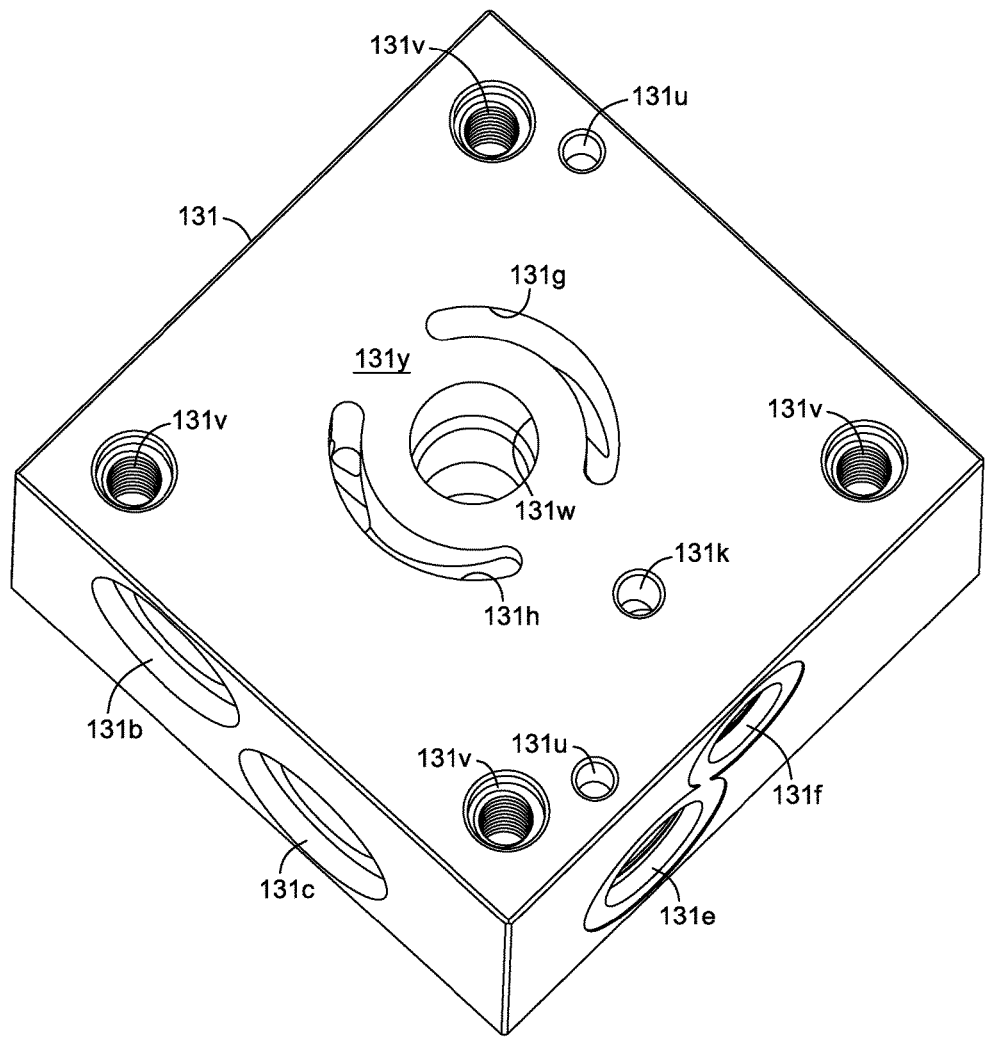
FIG. 4 is a perspective view of a port block as may be used in the flow divider assembly of FIG. 1.
Figure 5:
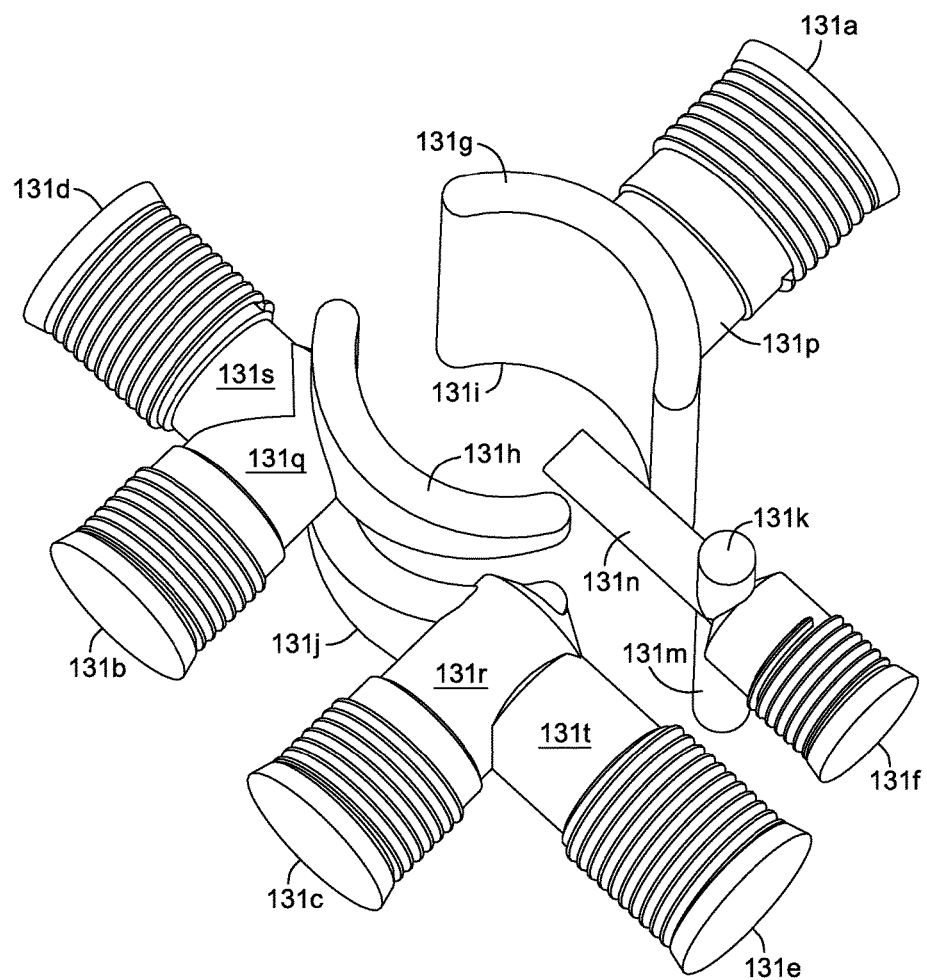
FIG. 5 is a representational, perspective view of the hydraulic porting inside the port block of the flow divider assembly of FIG. 1.

Mounted within each cap 133a, 133b is a thrust bearing 145a, 145b. As shown most clearly in FIG. 3, the two cylinder blocks 141a, 141b include a respective set of motor pistons 142a, 142b engaged to thrust bearings 145a, 145b. Motor shaft 149 extends through port block 131 and engages first motor cylinder block 141a at a first portion of motor shaft 149 and engages second motor cylinder block 141b at a second portion of motor shaft 149. These engagements are depicted herein as splines. As shown in FIG. 3, motor shaft 149 is supported by bearing 148a in cap 133a, bearing 148b in cap 133b, and bearing 148c in port block 131.

Port block 131 comprises inlet port 131a, outlet port A 131b, outlet port B 131c, kidney inlet port A 131g, kidney outlet port A 131h, kidney inlet port B 131i, kidney outlet port B 131j, inlet passage 131p, outlet passage A 131q; outlet passage B 131r; alignment pin holes 131u; threaded openings 131v and shaft opening 131w. Drain port 131f is connected to drain passage A 131k, drain passage B 131m and central drain passage 131n and exhausts to an external reservoir 160. Two optional outlet ports, namely optional outlet port A 131*d* and optional outlet port B 131*e*, are connected to optional outlet passage A 131*s* and optional outlet passage B 131*t*, respectively, to provide flexibility in terms of mounting or installation of the unit.

This embodiment is a constant split flow design, with possible variance being introduced by means of changing the ratio of motors 140*a* and 140*b*, i.e., by changing the angle of thrust bearing 145*a* from the axis of rotation of motor shaft 149 with respect to the angle of thrust bearing 145*b* to that axis, in order to provide different output to drive motors 123*a*, 123*b*, or by using motors having different displacements. The user can set the angles of thrust bearings 145*a*, 145*b*, depending on the desired output of the respective motors 140*a* and 140*b*. The mounting of the thrust bearings in the caps 133*a* and 133*b* simplifies such modifications.

The second embodiment of FIGS. 7-12 is similar in many respects to the first embodiment, and as noted above, those elements that may be structurally or operationally identical to those previously described will not be described in detail as such a description is not critical to an understanding of the invention. Flow divider assembly 230 incorporates port block 231, which may be somewhat larger in size than port block 131 to incorporate a pair of valves, and specifically as shown herein electronically actuated solenoid valves 252*a* and 252*b*. As shown most clearly in the schematic of FIG. 12, valves 252*a* and 252*b*, which may be of a standard design, permit the user to bypass the motors 240*a*, 240*b* in the event the user wishes to prevent flow to one of the motors 223*a*, 223*b*.

Figure 9:
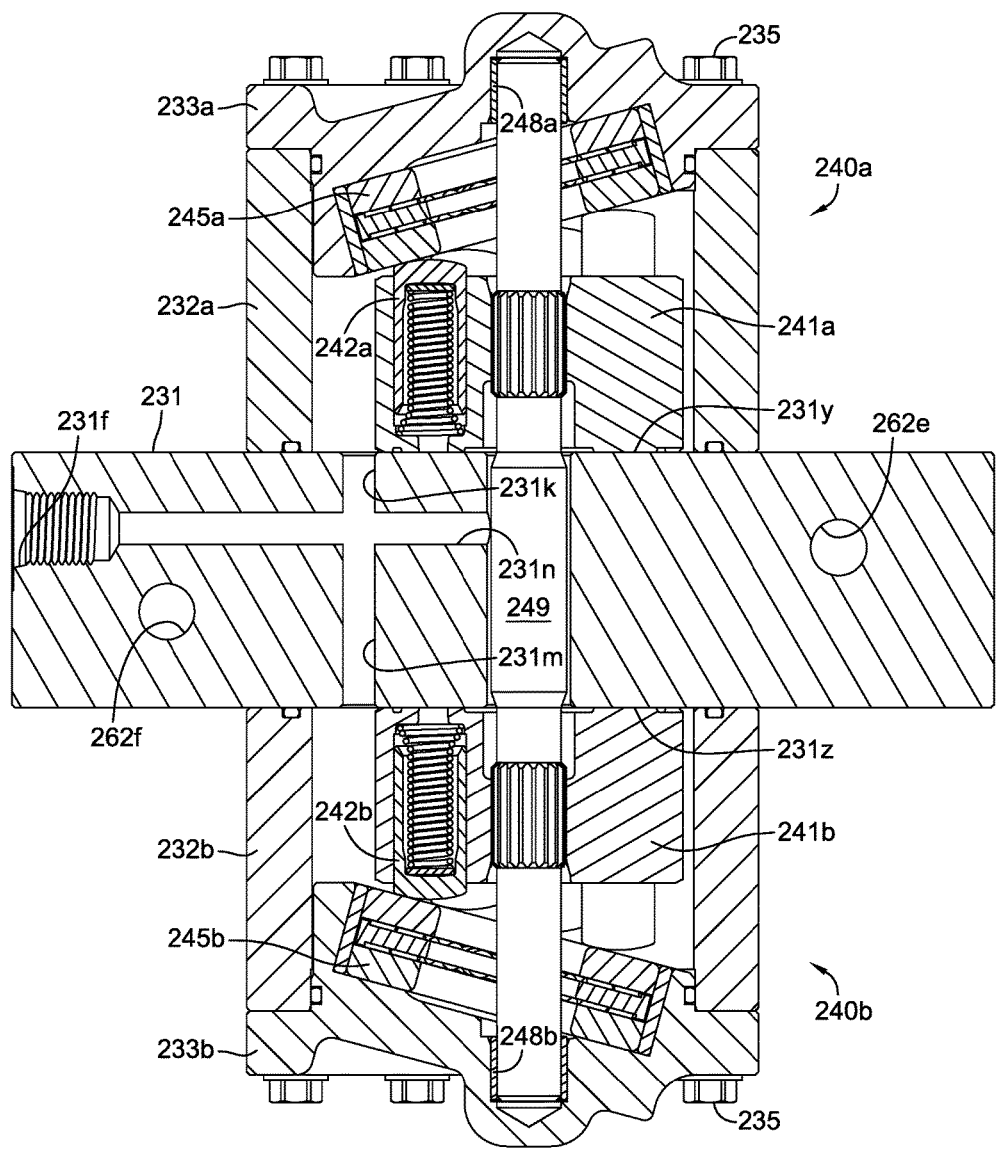
FIG. 9 is a cross-sectional view along the lines 9-9 of FIG. 7.
Figure 10:
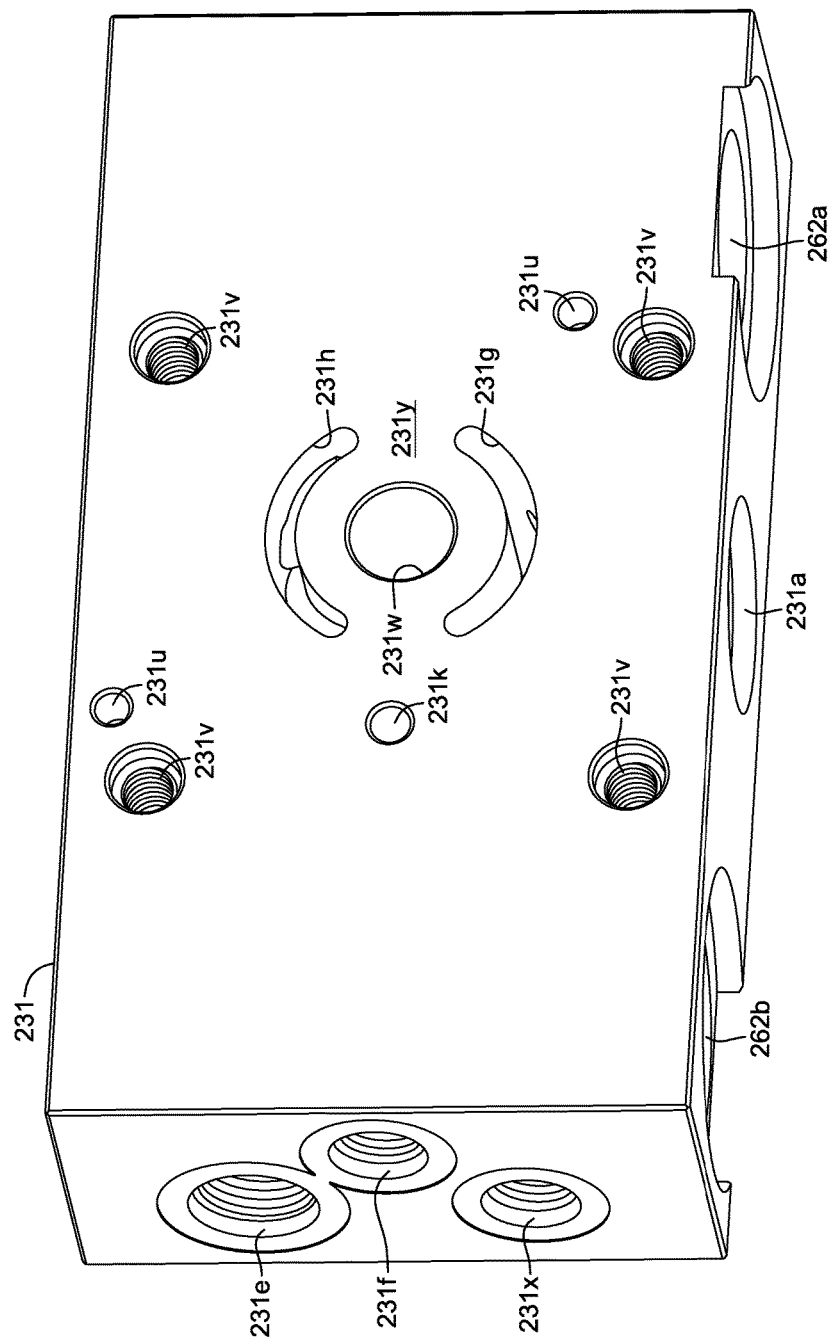
FIG. 10 is a perspective view of a port block as may be used in the flow divider assembly of FIG. 7.
Figure 11:
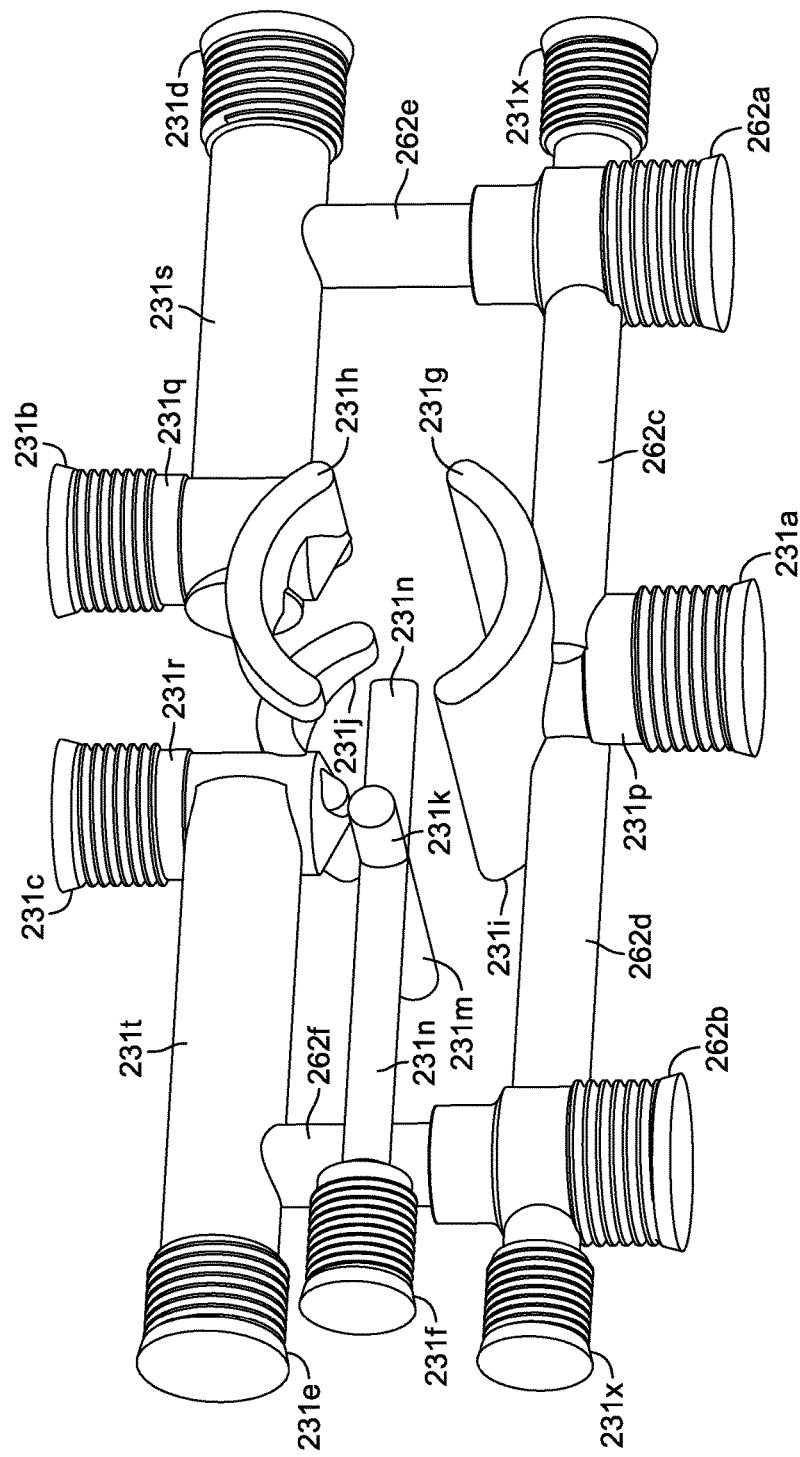
FIG. 11 is a representational, perspective view of the hydraulic porting inside the port block of the flow divider assembly of FIG. 7.
Figure 12:
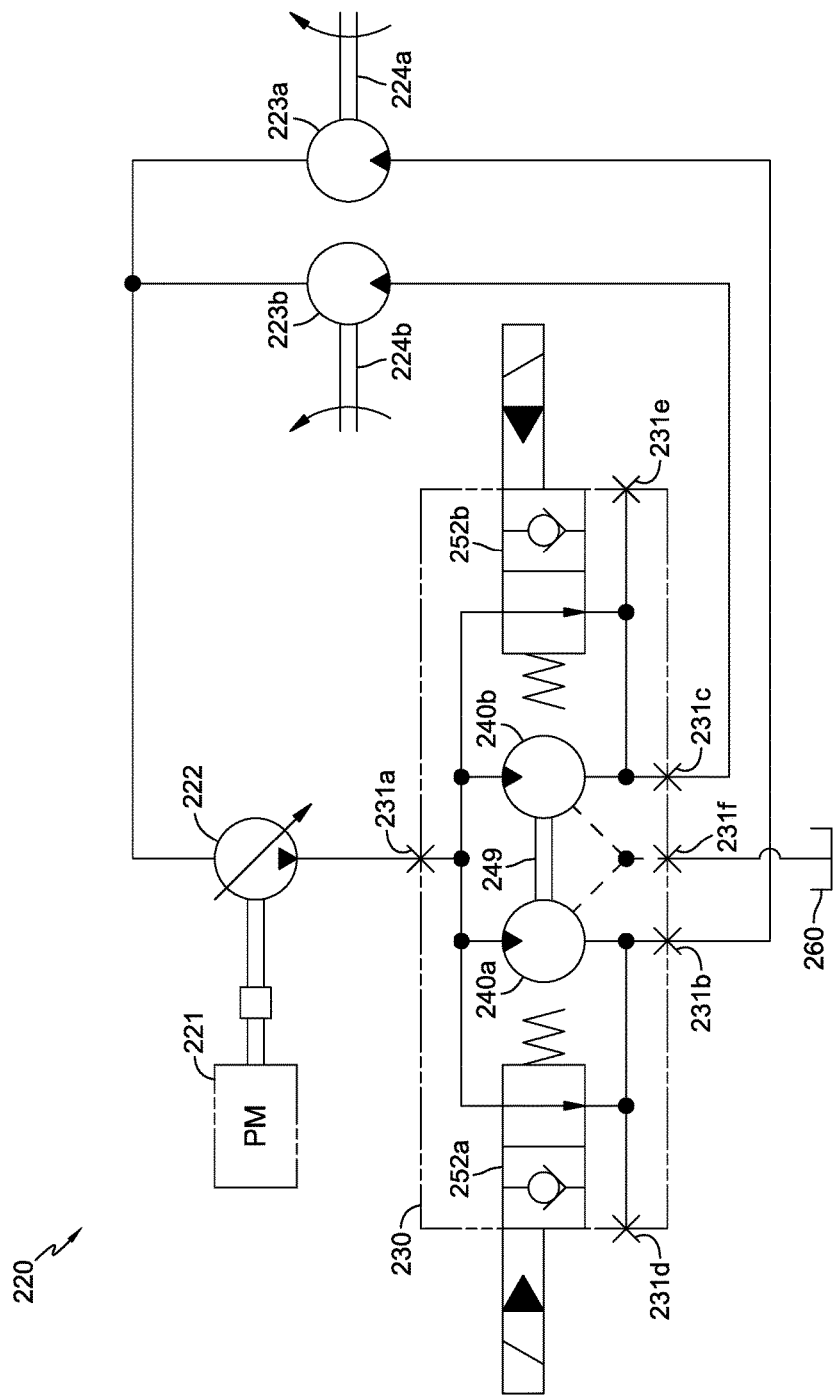
FIG. 12 is a schematic showing an exemplary drive system incorporating the flow divider assembly of FIG. 7.

As in the prior embodiment, the output of flow divider assembly 230 drives a pair of motors 223*a*, 223*b* and their respective drive shafts or axles 224*a*, 224*b* for a vehicle or other application. Each motor assembly 240*a*, 240*b* comprises a motor housing 232*a*, 232*b* having a cap 233*a*, 233*b* secured thereto by means of fasteners 235, and a motor cylinder block 241*a*, 241*b* disposed therein and including motor pistons 242*a*, 242*b* engaged to thrust bearings 245*a*, 245*b*. Motor housings 232*a*, 232*b* are fastened to port block 231 by means of fasteners 234. Motor shaft 249 extends through port block 231. As shown in FIG. 9, motor shaft 249 is supported by bearing 248*a* in cap 233*a* and bearing 248*b* in cap 233*b*.

Port block 231 comprises inlet port 231*a*, outlet port A 231*b*, outlet port B 231*c*, kidney inlet port A 231*g*, kidney outlet port A 231*h*, kidney inlet port B 231*i*, kidney outlet port B 231*j*, inlet passage 231*p*, outlet passage A 231*q*; outlet passage B 231*r*; alignment pin holes 231*u*; threaded openings 231*v*, shaft opening 231*w*, and a pair of running surfaces 231*y* (running surface A) and 231*z* (running surface B). Drain port 231*f* is connected to drain passage A 231*k*, drain passage B 231*m* and central drain passage 231*n* and exhausts to an external reservoir 260. Two optional outlet ports, namely optional outlet port A 231*d* and optional outlet port B 231*e*, are connected to optional outlet passage A 231*s* and optional outlet passage B 231*t*, respectively, to provide flexibility in terms of mounting or installation of the unit. Machining ports 231*x* closed by plugs 236 may also be used in assembly.

Figure 13:
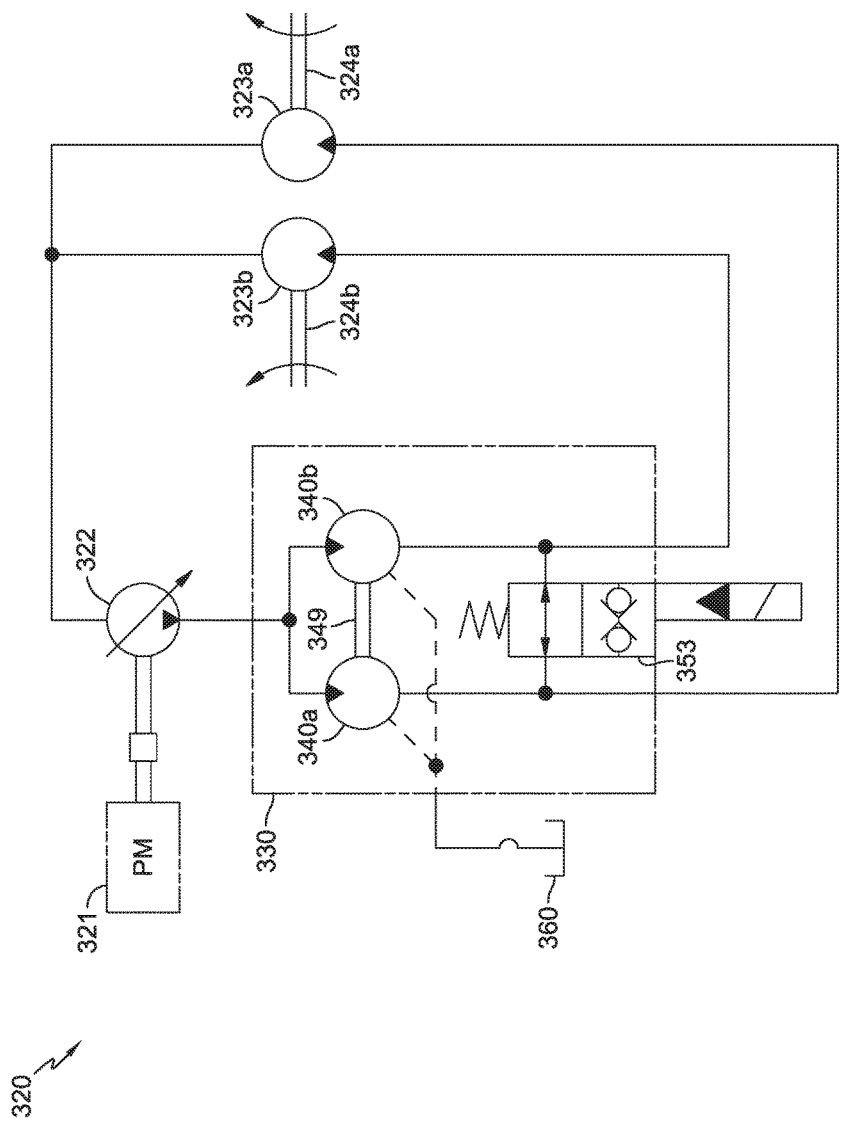
FIG. 13 is a schematic showing an exemplary drive system incorporating a third embodiment incorporating a flow divider in accordance with the principles of the present invention.

A third embodiment is shown schematically in FIG. 13. This embodiment is similar in many respects to the embodiment shown in FIG. 12 but uses a single, bi-directional valve 353 in place of the two valves of the prior embodiment. Valve 353 is preferably a solenoid operated valve and when valve 353 is in the closed position, flow divider assembly 330 will operate substantially the same as flow divider assembly 130 in the first embodiment. When valve 353 is opened, the flow from motors 340*a*, 340*b* will take the path of least resistance, in the event that the output of one of the motors 323*a*, 323*b* is blocked, for example. As shown, motors 323*a*, 323*b* drive respective drive shafts or axles 324*a*, 324*b*. Flow divider assembly is also connected to a sump 360, in a manner as set forth previously.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof. For example, while certain embodiments are shown schematically, it will be understood that the basic structural elements can be similar in many respects to those of the earlier embodiments.

What is claimed is:

1. A hydraulic drive assembly, comprising:
    a hydraulic pump;
    a flow divider assembly in fluid communication with the hydraulic pump, the flow divider assembly comprising:
        a port block comprising:
            a first face;
            a first running surface formed on the first face;
            a second face opposite the first face; and
            a second running surface formed on the second face;
        a first motor housing engaged with the first face;
        a first cap engaged with the first motor housing, and a first bearing disposed within the first cap;
        a second motor housing engaged with the second face;
        a second cap engaged with the second motor housing, and a second bearing disposed within the second cap;
        a single motor shaft having an axis of rotation, and extending through the port block, the single motor shaft having a first end extending into the first cap and being supported by the first bearing within the first cap, whereby the first end does not extend through the first cap, and a second end extending into the second cap and being supported by the second bearing within the second cap, whereby the second end does not extend through the second cap;
        a first motor cylinder block rotatably disposed on the first running surface and engaged with the motor shaft, the first motor cylinder block having a first plurality of pistons disposed therein;
        a first fixed swash plate disposed in the first cap, engaged with the first plurality of pistons, and mounted at a first angle with respect to the axis of rotation;
        a second motor cylinder block rotatably disposed on the second running surface and engaged with the motor shaft, the second motor cylinder block having a second plurality of pistons disposed therein;
        a second fixed swash plate disposed in the second cap, engaged with the second plurality of pistons, and mounted at a second angle with respect to the axis of rotation;
        a single inlet port in fluid communication with the hydraulic pump to provide fluid from the hydraulic pump to the first motor cylinder block and to the second motor cylinder block;
        a first outlet port in fluid communication with the first motor cylinder block and a second outlet port in fluid communication with the second motor cylinder block, wherein the first motor cylinder block provides a first level of hydraulic output and the second motor cylinder block provides a second level of hydraulic output; and a first drive motor hydraulically in fluid communication with the first outlet port and a second drive motor in fluid communication with the second outlet port, whereby the first drive motor is hydraulically powered by the first level of hydraulic output and the second drive motor is hydraulically powered by the second level of hydraulic output.

2. The hydraulic drive assembly of claim 1, wherein the port block further comprises a drain port in fluid communication with the first motor cylinder block and the second motor cylinder block.

3. The hydraulic drive assembly of claim 2, further comprising a separate reservoir in fluid communication with the drain port.

4. The hydraulic drive assembly of claim 1, wherein the port block further comprises a third outlet port in fluid communication with the first motor cylinder block and a fourth outlet port formed in the port block and connected to the second motor cylinder block.

5. The hydraulic drive assembly of claim 1, further comprising a third bearing disposed within the port block, wherein the first bearing, the second bearing and the third bearing directly support the single motor shaft.

6. A flow divider assembly for use with a hydraulic system including a hydraulic pump, the flow divider assembly comprising:
   a port block comprising a first face, a first running surface formed on the first face, a second face opposite the first face, and a second running surface formed on the second face;
   a first motor housing engaged with the first face;
   a first cap engaged with the first motor housing, and a first bearing disposed within the first cap;
   a second motor housing engaged with the second face;
   a second cap engaged with the second motor housing, and a second bearing disposed within the second cap;
   a motor shaft having an axis of rotation, and extending through the port block, the motor shaft having a first end extending into the first cap and being supported by the first bearing, whereby the first end does not extend through the first cap, and a second end extending into the second cap and being supported by the second bearing, whereby the second end does not extend through the second cap;
   a first motor cylinder block rotatably disposed on the first running surface and engaged with the motor shaft, the first motor cylinder block having a first plurality of pistons disposed therein;
   a first fixed swash plate disposed in the first cap, engaged with the first plurality of pistons, and mounted at a first angle with respect to the axis of rotation;
   a second motor cylinder block rotatably disposed on the second running surface and engaged with the motor shaft, the second motor cylinder block having a second plurality of pistons disposed therein;
   a second fixed swash plate disposed in the second cap, engaged with the second plurality of pistons, and mounted at a second angle with respect to the axis of rotation;
   a single inlet port capable of being in fluid communication with the hydraulic pump to provide fluid from the hydraulic pump to the first motor cylinder block and to the second motor cylinder block; and a first outlet port in fluid communication with the first motor cylinder block and a second outlet port in fluid communication with the second motor cylinder block, wherein the first motor cylinder block provides a first level of hydraulic output and the second motor cylinder block provides a second level of hydraulic output.

7. The flow divider assembly of claim 6, wherein the port block further comprises a drain port in fluid communication with the first motor cylinder block and with the second motor cylinder block, and a separate reservoir in fluid communication with the drain port.

8. The flow divider assembly of claim 6, wherein the port block further comprises a third outlet port in fluid communication with the first motor cylinder block and a fourth outlet port in fluid communication with the second motor cylinder block.

9. The flow divider assembly of claim 6, further comprising a third bearing disposed within the port block, wherein the first bearing, the second bearing and the third bearing directly support the motor shaft.

10. An apparatus for dividing flow in a hydraulic system including a hydraulic pump, the apparatus comprising:
   a port block comprising:
      a first face having a first running surface;
      a second face opposite the first face and having a second running surface;
      an inlet port in fluid communication with the first running surface and with the second running surface, the inlet port to fluidly communicate with the hydraulic pump;
      a first outlet port in fluid communication with the first running surface;
      a second outlet port in fluid communication with the second running surface;
   a first cylinder block rotatably engaged with the first running surface, the first cylinder block having a first set of pistons in fluid communication with the first running surface;
   a first motor housing about the first cylinder block and engaged with the first face;
   a first cap engaged with the first motor housing, and a first bearing disposed within the first cap;
   a second cylinder block rotatably engaged with the second running surface, the second cylinder block having a second set of pistons in fluid communication with the second running surface;
   a second motor housing about the second cylinder block and engaged with the second face;
   a second cap engaged with the second motor housing, and a second bearing disposed within the second cap;
   a first swash plate disposed in the first cap and engaged with the first set of pistons;
   a second swash plate disposed in the second cap and engaged with the second set of pistons; and
   a shaft having an axis of rotation, rotatably engaged with the port block, and drivably engaged with the first cylinder block and the second cylinder block, the shaft having a first end extending into the first cap and being supported by the first bearing, whereby the first end does not extend through the first cap, and a second end extending into the second cap and being supported by the second bearing, whereby the second end does not extend through the second cap.

11. The apparatus of claim 10, wherein:
   the first face, the first motor housing, and the first cap define a first space;

the second face, the second motor housing, and the second cap define a second space;

the port block has a shaft passage, the shaft extending through the port block via the shaft passage; and the port block includes a drain port in fluid communication with at least one of the first space, the second space, and the shaft passage.

12. The apparatus of claim 10, wherein the port block includes a first kidney inlet, a first kidney outlet, a second kidney inlet, and a second kidney outlet, the inlet port being in fluid communication with the first running surface via the first kidney inlet and the with the second running surface via the second kidney inlet, the first outlet port being in fluid communication with the first running surface via the first kidney outlet, and the second outlet port being in fluid communication with the second running surface via the second kidney outlet.

13. The apparatus of claim 10, wherein the shaft is rotatably engaged with the port block via a third bearing.

14. The apparatus of claim 10, further comprising:

a first valve in fluid communication with the inlet port, with the first outlet port, and with the first cylinder block; and a second valve in fluid communication with the inlet port, with the second outlet port, and with the second cylinder block, wherein the first valve selectively bypasses fluid flow away from the first cylinder block and the second valve selectively bypasses fluid flow away from the second cylinder block.

15. The apparatus of claim 10, including a single bidirectional valve in fluid communication with the first outlet port, with the second outlet port, with the first cylinder block, and with the second cylinder block, wherein the single bidirectional valve connects an output of the first cylinder block with an output of the second cylinder block when the single bidirectional valve is opened.

16. The apparatus of claim 10, wherein the first cylinder block provides a first hydraulic output level and the second cylinder block provides a second hydraulic output level different from the first hydraulic output level.

17. The apparatus of claim 16, wherein the first outlet port is in fluid communication with a first drive motor and the second outlet port is in fluid communication with a second drive motor, the first drive motor being powered by the first hydraulic output level, the second drive motor being powered by the second hydraulic output level.

18. The apparatus of claim 10, wherein the port block further comprises a third outlet port in fluid communication with the first running surface; and a fourth outlet port in fluid communication with the second running surface.

19. The apparatus of claim 10, wherein the shaft extends through the first cylinder block and through the second cylinder block.

20. The apparatus of claim 10, wherein the first swash plate is engaged with the first set of pistons via a first thrust bearing and the second swash plate is engaged with the second set of pistons via a second thrust bearing, the shaft extending through the first thrust bearing and through the second thrust bearing.

* * * * *